(12) United States Patent
Shirai (10) Patent No.: US 11,750,135 B2
(45) Date of Patent: Sep. 5, 2023

(54) MOTOR CONTROL DEVICE AND ELECTRIC PUMP DEVICE

(71) Applicant: NIDEC TOSOK CORPORATION, Kanagawa (JP)

(72) Inventor: Yasuhiro Shirai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/841,665

(22) Filed: Jun. 16, 2022

(65) Prior Publication Data

US 2022/0416704 A1    Dec. 29, 2022

(30) Foreign Application Priority Data

Jun. 29, 2021    (JP) ................................. 2021-107256

(51) Int. Cl.
*H02P 8/00* (2006.01)
*H02P 23/14* (2006.01)
*H02P 3/18* (2006.01)

(52) U.S. Cl.
CPC ............... *H02P 23/14* (2013.01); *H02P 3/18* (2013.01)

(58) Field of Classification Search
CPC ...... H02P 29/027; H02P 29/032; H02P 23/14; H02P 3/18
USPC ........................................................ 318/696
See application file for complete search history.

(56) References Cited

U.S. PATENT DOCUMENTS

| | | | |
|---|---|---|---|
| 2009/0095061 A1* | 4/2009 | Fujino | B60R 16/0232 73/114.41 |
| 2011/0135499 A1* | 6/2011 | Lee | F04B 49/06 417/44.1 |
| 2013/0309101 A1* | 11/2013 | Uda | F16H 61/0031 417/45 |
| 2020/0018304 A1* | 1/2020 | Sato | H02P 6/16 |
| 2020/0240512 A1* | 7/2020 | Yashiro | F01M 5/00 |
| 2021/0285143 A1* | 9/2021 | Cheon | D06F 39/085 |

FOREIGN PATENT DOCUMENTS

JP    H11289795 A    10/1999

\* cited by examiner

*Primary Examiner* — Kawing Chan
*Assistant Examiner* — Gabriel Agared
(74) *Attorney, Agent, or Firm* — HAUPTMAN HAM, LLP (57) ABSTRACT

One aspect of a motor control device according to the present invention is a motor control device that controls a motor of an electric pump. The motor control device includes a drive unit that supplies a drive current to the motor; a control unit that controls a rotation speed of the motor by controlling the drive unit based on a rotation speed command value; and a current detection unit that detects the drive current supplied to the motor, and supplies a current detection value indicating a detection result of the drive current to the control unit. The control unit determines whether or not a foreign fluid suction abnormality occurs in the electric pump, based on a first current detection value acquired at a first timing when the rotation speed command value changes from a first command value to a second command value and a second current detection value acquired after the first timing.

7 Claims, 5 Drawing Sheets

MOTOR CONTROL DEVICE AND ELECTRIC PUMP DEVICE

CROSS-REFERENCE TO RELATED APPLICATIONS

The present invention claims priority under 35 U.S.C. § 119 to Japanese Patent Application No. 2021-107256 filed on Jun. 29, 2021, the entire content of which is incorporated herein by reference.

FIELD OF THE INVENTION

The present invention relates to a motor control device and an electric pump device.

BACKGROUND

Conventionally, there is known a power conversion device that integrates current values of respective phases of an electric motor and determines that an abnormality has occurred in a current detection system of a phase in which the integrated value is equal to or greater than a reference value.

In the conventional technique, the abnormality cannot be detected quickly when a change in the current value of each phase deviates from a change in the current value in the normal state in which the current value increases along with an increase in the rotation speed, and there is a possibility that a failure of the electric pump occurs.

SUMMARY

One aspect according to an exemplary motor control device of the present invention is a motor control device that controls a motor of an electric pump. The motor control device includes a drive unit that supplies a drive current to the motor; a control unit that controls the rotation speed of the motor by controlling the drive unit based on a rotation speed command value; and a current detection unit that detects the drive current supplied to the motor and supplies a current detection value indicating a detection result of the drive current to the control unit. The control unit determines whether or not a foreign fluid suction abnormality occurs in the electric pump, based on a first current detection value acquired at a first timing when the rotation speed command value changes from a first command value to a second command value and a second current detection value acquired after the first timing.

One aspect according to an exemplary electric pump device of the present invention includes an electric pump, and a motor control device according to the above-described aspect and controlling a motor of the electric pump.

The above and other elements, features, steps, characteristics and advantages of the present disclosure will become more apparent from the following detailed description of the preferred embodiments with reference to the attached drawings.

DETAILED DESCRIPTION

An embodiment of the present invention will be described in detail below with reference to the drawings.

Figure 1:
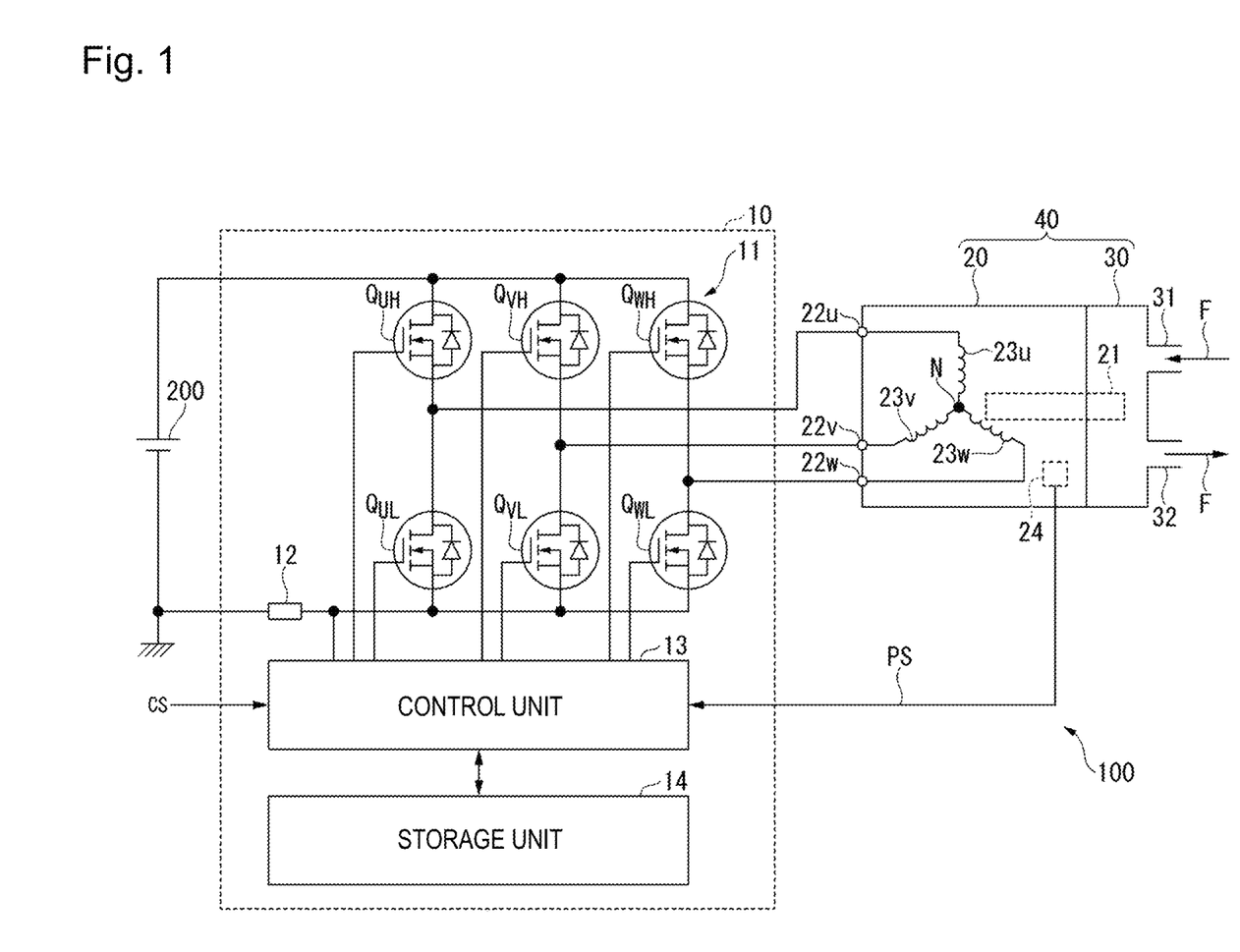
FIG. 1 is a block diagram schematically illustrating an electric pump device having a motor control device according to the present embodiment.

FIG. 1 is a block diagram schematically illustrating an electric pump device 100 having a motor control device 10 according to the present embodiment. As illustrated in FIG. 1, the electric pump device 100 includes the motor control device 10 and an electric pump 40. The electric pump 40 includes a motor 20 and a pump 30. The electric pump device 100 is, for example, a device that supplies cooling oil F to a driving motor mounted on a hybrid vehicle.

The motor 20 of the electric pump 40 is, for example, an inner rotor type three-phase brushless DC motor. The motor 20 includes a shaft 21, a U-phase terminal 22$u$, a V-phase terminal 22$v$, a W-phase terminal 22$w$, a U-phase coil 23$u$, a V-phase coil 23$v$, a W-phase coil 23$w$, and a rotation angle sensor 24.

Further, although not illustrated in FIG. 1, the motor 20 includes a motor housing, and a rotor and a stator that are housed in the motor housing. The rotor is a rotating body rotatably supported by a bearing component inside the motor housing. The stator is fixed inside the motor housing in a state of surrounding an outer peripheral surface of the rotor, and generates an electromagnetic force necessary for rotating the rotor.

The shaft 21 is a shaft-like body coaxially joined to the rotor in a state of axially penetrating the radially inner side of the rotor. The U-phase terminal 22$u$, the V-phase terminal 22$v$, and the W-phase terminal 22$w$ are metal terminals exposed from a surface of the motor housing. Although details will be described later, the U-phase terminal 22$u$, the V-phase terminal 22$v$, and the W-phase terminal 22$w$ are electrically connected to a motor drive circuit 11 of the motor control device 10. The U-phase coil 23$u$, the V-phase coil 23$v$, and the W-phase coil 23$w$ are excitation coils provided in the stator. The U-phase coil 23$u$, the V-phase coil 23$v$, and the W-phase coil 23$w$ are star-connected inside the motor 20.

The U-phase coil 23$u$ is electrically connected between the U-phase terminal 22$u$ and a neutral point N. The V-phase coil 23$v$ is electrically connected between the V-phase terminal 22$v$ and the neutral point N. The W-phase coil 23$w$ is electrically connected between the W-phase terminal 22$w$ and the neutral point N. When the energization states of the U-phase coil 23$u$, the V-phase coil 23$v$, and the W-phase coil 23$w$ are controlled by the motor control device 10, an electromagnetic force necessary for rotating the rotor is generated. When the rotor rotates, the shaft 21 also rotates in synchronization with the rotor.

The rotation angle sensor 24 detects the rotation angle of the shaft 21, and outputs a rotation angle signal PS indicating the detection result to the motor control device 10. As the rotation angle sensor 24, for example, a Hall sensor, an incremental encoder, an absolute encoder, or the like can be used.

The pump 30 is located on one side in the axial direction of the shaft 21 of the motor 20, and is driven by the motor 20 via the shaft 21 to discharge the cooling oil F. The pump 30 has an oil suction port 31 and an oil discharge port 32. The cooling oil F is sucked into the pump 30 from the oil suction port 31 and then discharged to the outside of the pump 30 from the oil discharge port 32. As described above, the electric pump 40 is configured by connecting the pump 30 and the motor 20 adjacent to each other in the axial direction of the shaft 21.

The motor control device 10 is a device that controls the motor 20 of the electric pump 40 based on a rotation speed command signal CS output from a host control device (not illustrated) and a rotation angle signal PS output from the rotation angle sensor 24. As an example, the host control device is an in-vehicle electronic control unit (ECU) mounted on a hybrid vehicle. The motor control device 10 includes a motor drive circuit 11 (drive unit), a shunt resistor 12 (current detection unit), a control unit 13, and a storage unit 14.

The motor drive circuit 11 is a circuit that supplies a drive current to the motor 20. Specifically, the motor drive circuit 11 converts a DC power supply voltage supplied from the DC power supply 200 into a three-phase AC voltage and outputs it to the motor 20. As a result, a three-phase alternating current is supplied from the motor drive circuit 11 to the motor 20 as a drive current. As an example, the DC power supply 200 is a battery mounted on a hybrid vehicle.

The motor drive circuit 11 includes a U-phase upper arm switch $Q_{UH}$, a V-phase upper arm switch $Q_{VH}$, a W-phase upper arm switch $Q_{WH}$, a U-phase lower arm switch $Q_{UL}$, a V-phase lower arm switch $Q_{VL}$, and a W-phase lower arm switch $Q_{WL}$. In the present embodiment, each of the arm switches is, for example, an N-channel MOS-FET.

The drain terminal of the U-phase upper arm switch $Q_{UH}$, the drain terminal of the V-phase upper arm switch $Q_{VH}$, and the drain terminal of the W-phase upper arm switch $Q_{WH}$ are electrically connected to the positive electrode terminal of the DC power supply 200. The source terminal of the U-phase lower arm switch $Q_{UL}$, the source terminal of the V-phase lower arm switch $Q_{VL}$, and the source terminal of the W-phase lower arm switch $Q_{WL}$, are electrically connected to the negative electrode terminal of the DC power supply 200 via the shunt resistor 12. The negative electrode terminal of the DC power supply 200 is electrically connected to the in-vehicle ground.

The source terminal of the U-phase upper arm switch $Q_{UH}$ is electrically connected to each of the U-phase terminal 22u of the motor 20 and the drain terminal of the U-phase lower arm switch $Q_{UL}$. The source terminal of the V-phase upper arm switch $Q_{VH}$ is electrically connected to each of the V-phase terminal 22v of the motor 20 and the drain terminal of the V-phase lower arm switch $Q_{VL}$. The source terminal of the W-phase upper arm switch $Q_{WH}$ is electrically connected to each of the W-phase terminal 22w of the motor 20 and the drain terminal of the W-phase lower arm switch $Q_{WL}$.

The gate terminal of the U-phase upper arm switch $Q_{UH}$, the gate terminal of the V-phase upper arm switch $Q_{VH}$, and the gate terminal of the W-phase upper arm switch $Q_{WH}$ are electrically connected to the control unit 13. The gate terminal of the U-phase lower arm switch $Q_{UL}$, the gate terminal of the V-phase lower arm switch $Q_{VL}$, and the gate terminal of the W-phase lower arm switch $Q_{WL}$ are also electrically connected to the control unit 13.

As described above, the motor drive circuit 11 is an inverter configured of a three-phase full-bridge circuit having three upper arm switches and three lower arm switches. The motor drive circuit 11 configured as described above converts the DC power supply voltage supplied from the DC power supply 200 into a three-phase AC voltage, with switching control of the respective arm switches by the control unit 13, and outputs the three-phase AC voltage to the motor 20. As a result, a three-phase alternating current is supplied from the motor drive circuit 11 to the motor 20 as a drive current.

The shunt resistor 12 detects the drive current supplied to the motor 20, and supplies a current detection value Id indicating a detection result of the drive current to the control unit 13. One end of the shunt resistor 12 is electrically connected to each of the source terminals of the U-phase lower arm switch $Q_{UL}$, the V-phase lower arm switch $Q_{VL}$, and the W-phase lower arm switch $Q_{WL}$. The other end of the shunt resistor 12 is electrically connected to the negative electrode terminal of the DC power supply 200. Furthermore, one end of the shunt resistor 12 is electrically connected to the control unit 13. The drive current supplied to the motor 20 flows into the vehicle interior ground via the shunt resistor 12. Therefore, a voltage proportional to the drive current appears between the terminals of the shunt resistor 12. Such an inter-terminal voltage of the shunt resistor 12 is supplied to the control unit 13 as the current detection value Id indicating the detection result of the drive current. Note that a resistance voltage divider circuit may be provided between one end of the shunt resistor 12 and the control unit 13 as necessary.

The control unit 13 is, for example, a microprocessor such as a microcontroller unit (MCU). To the control unit 13, a rotation speed command signal CS output from a host control device (not illustrated) and a rotation angle signal PS output from the rotation angle sensor 24 are input. The control unit 13 is communicably connected to the storage unit 14 via a communication bus (not illustrated). The control unit 13 executes at least a motor control process and a pump abnormality diagnosis process described below, according to a program stored in advance in the storage unit 14.

In the motor control process, the control unit 13 calculates the actual rotation speed Rm of the motor 20 from the rotation angle signal PS, and controls the motor drive circuit 11 based on the rotation speed command value Rc instructed by the rotation speed command signal CS and the actual rotation speed Rm, thereby controlling the rotation speed of the motor 20. Specifically, the control unit 13 determines a switching duty ratio of each arm switch necessary for matching the actual rotation speed Rm of the motor 20 with the rotation speed command value Rc, and performs switching control of each arm switch with the determined switching duty ratio. As a result, a three-phase AC voltage that matches the actual rotation speed Rm of the motor 20 with the rotation speed command value Rc is supplied from the motor drive circuit 11 to the motor 20.

In the pump abnormality diagnosis process, the control unit 13 determines whether or not a foreign fluid suction abnormality occurs in the electric pump 40, based on the first current detection value acquired at the first timing when the rotation speed command value Rc changes from the first command value Rc1 to the second command value Rc2, and the second current detection value acquired after the first timing. The foreign fluid suction abnormality means that a fluid (foreign fluid) having a property different from that of the cooling oil F is sucked into the pump 30. The foreign fluid is, for example, a fluid such as the air, water, or gas.

The storage unit 14 includes a nonvolatile memory that stores a program, various types of setting data, and the like necessary for causing the control unit 13 to execute various types of processing, and a volatile memory used as a temporary storage destination of data when the control unit 13 executes various types of processing. The nonvolatile memory is, for example, an electrically erasable programmable read-only memory (EEPROM), a flash memory, or the like. The volatile memory is, for example, a random access memory (RAM) or the like. As illustrated in FIG. 1, the storage unit 14 may be provided outside the control unit 13 or may be incorporated in the control unit 13.

Hereinafter, a pump abnormality diagnosis process executed by the control unit 13 will be described in detail.

Figure 2:
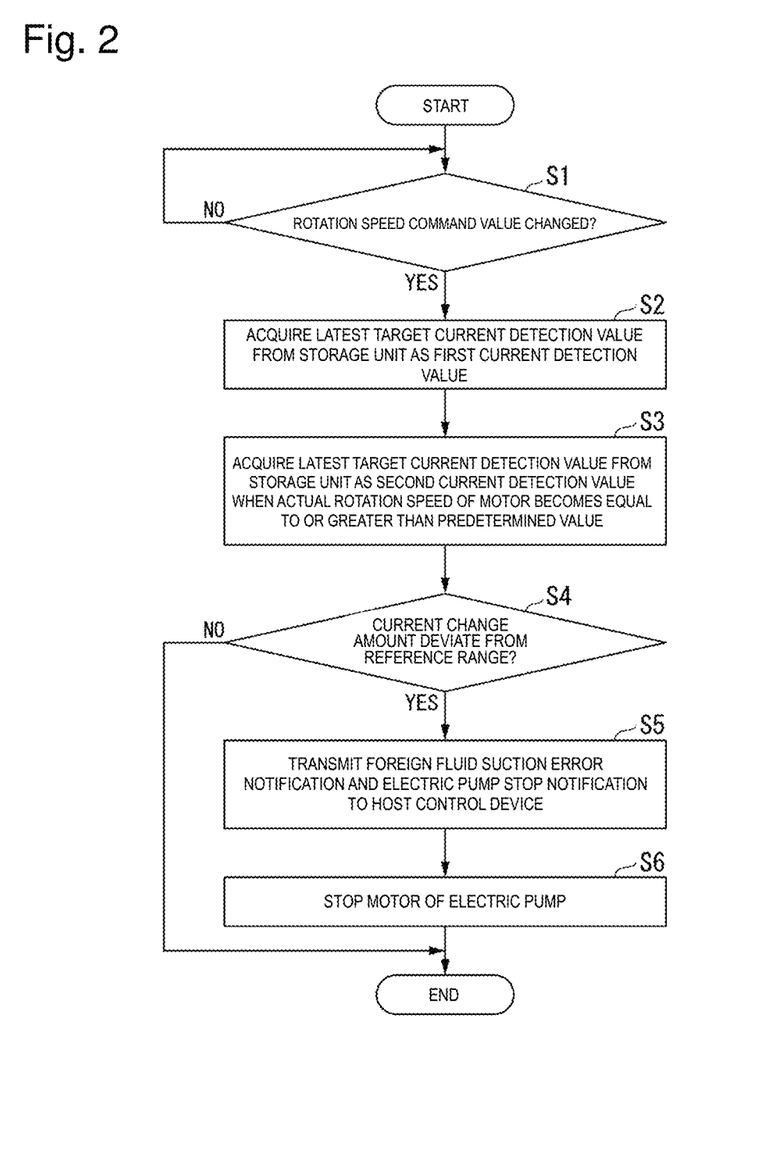
FIG. 2 is a flowchart illustrating a first pump abnormality diagnosis process executed by a control unit when a motor is in a steady rotation state.

First, a first pump abnormality diagnosis process that is a first example of the pump abnormality diagnosis process will be described with reference to FIGS. 2 and 3. FIG. 2 is a flowchart illustrating the first pump abnormality diagnosis process executed by the control unit 13. The control unit 13 executes the first pump abnormality diagnosis process when the motor 20 is in a steady rotation state. The steady rotation state is a state where the motor 20 continues to rotate at the same rotation speed as the rotation speed command value Rc. In other words, the steady rotation state is a state in which the actual rotation speed Rm of the motor 20 coincides with the rotation speed command value Rc.

Figure 3:
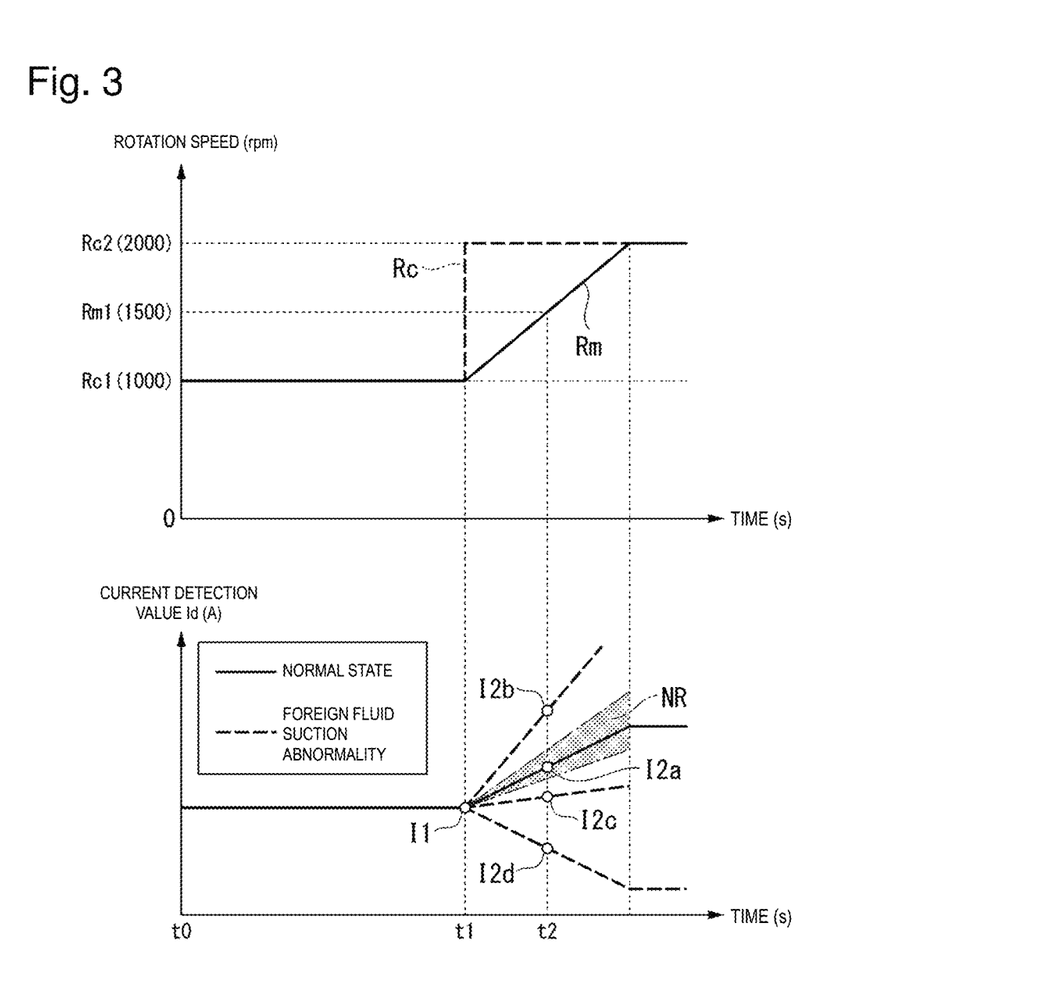
FIG. 3 is a diagram illustrating a first example of temporal changes of a rotation speed command value, an actual rotation speed, and a current detection value.

For example, in FIG. 3, a period from time t0 to time t1 is a period in which the motor 20 is in the steady rotation state. In the following description, a period from time t0 to time t1 may be referred to as a steady rotation period. During the steady rotation period, the actual rotation speed Rm of the motor 20 coincides with the first command value Rc1. The first command value Rc1 is the rotation speed command value Rc when the motor 20 is in the steady rotation state. In the example illustrated in FIG. 3, the first command value Rc1 is 1000 rpm, and the actual rotation speed Rm of the motor 20 in the steady rotation period is also 1000 rpm. As illustrated in FIG. 3, in the steady rotation period, the current detection value Id supplied from the shunt resistor 12 to the control unit 13 is constant.

The control unit 13 executes moving average calculation of the current detection value Id in parallel with the first pump abnormality diagnosis process. In the moving average calculation, the control unit 13 acquires time-series data of the current detection value Id by sampling the current detection value Id supplied from the shunt resistor 12, that is, the voltage between the terminals of the shunt resistor 12 at the first time interval. The control unit 13 calculates a moving average value of the current detection value Id based on the time-series data of the current detection value Id, and acquires a moving average value calculated at the second time interval, among the calculated moving average values, as a target current detection value. The second time interval is longer than the first time interval. As an example, the first time interval is 50 μs, and the second time interval is 300 ms. The control unit 13 sequentially stores the target current detection value obtained at the second time interval by the moving average calculation of the current detection value Id as described above, in the storage unit 14.

As illustrated in FIG. 2, when the first pump abnormality diagnosis process is started when the motor 20 is in the steady rotation state, the control unit 13 first determines whether or not the rotation speed command value Rc has changed from the first command value Rc1 to the second command value Rc2 (step S1). The second command value Rc2 is larger than the first command value Rc1 by a predetermined value or more. As an example, the second command value Rc2 is larger than the first command value Rc1 by 100 rpm or more. That is, in step S1, the control unit 13 determines whether or not the rotation speed command value Rc has increased from the first command value Rc1 to the second command value Rc2.

When "No" in step S1, that is, when the rotation speed command value Rc does not change from the first command value Rc1 to the second command value Rc2, the control unit 13 repeatedly executes the processing of step S1 at predetermined time intervals until the rotation speed command value Rc changes from the first command value Rc1 to the second command value Rc2.

On the other hand, when "Yes" in step S1, that is, when the rotation speed command value Rc changes from the first command value Rc1 to the second command value Rc2, the control unit 13 acquires the latest target current detection value from the storage unit 14 as the first current detection value at the first timing when the rotation speed command value Rc changes (step S2).

In the example illustrated in FIG. 3, it is assumed that the rotation speed command value Rc changes (rises) from the first command value Rc1 to the second command value Rc2 at time t1. As an example, the second command value Rc2 is 2000 rpm. In this case, the control unit 13 acquires the latest target current detection value as the first current detection value I1 from the storage unit 14 at time t1 (first timing).

Subsequently, the control unit 13 acquires the latest target current detection value from the storage unit 14 as the second current detection value at the second timing when the actual rotation speed Rm of the motor 20 becomes equal to or greater than a predetermined value after the first timing (step S3). In the example illustrated in FIG. 3, it is assumed that the actual rotation speed Rm of the motor 20 becomes equal to or greater than a predetermined value Rm1 at time t2. As an example, the predetermined value Rm1 is a center value (1500 rpm) between the first command value Rc1 and the second command value Rc2. In this case, the control unit 13 acquires the latest target current detection value as the second current detection value I2 from the storage unit 14 at time t2 (second timing).

As illustrated in FIG. 3, when the rotation speed command value Rc changes from the first command value Rc1 to the second command value Rc2 at time t1, the control unit 13 executes the motor control process in parallel with the first pump abnormality diagnosis process, whereby the actual rotation speed Rm of the motor 20 starts increasing toward the second command value Rc2. When the electric pump 40 is normal, as the actual rotation speed Rm of the motor 20 increases toward the second command value Rc2, the current detection value Id also rises from the time t1, which is the first timing, as a starting point. In FIG. 3, a reference sign I2a denotes a second current detection value obtained at time t2 (second timing) when the electric pump 40 is normal. The second current detection value I2a is located within a reference range NR. The reference range NR is a region through which the locus of the current detection value Id rising from the first timing passes when the electric pump 40 is normal.

In FIG. 3, reference signs I2b, I2c, and I2d each denote second current detection values obtained at time t2 (second timing) when a foreign fluid suction abnormality occurs in the electric pump 40. For example, when a foreign fluid that increases the load of the motor 20 is sucked into the electric pump 40, the current detection value Id rises from time t1, which is the first timing, as a starting point similarly to the normal time, but since the load becomes larger than that in the normal time, the rising locus of the current detection value Id passes through a region deviated upward from the reference range NR. A reference sign I2b denotes a second current detection value obtained at time t2 (second timing) when a foreign fluid that increases the load of the motor 20 is sucked into the electric pump 40.

For example, when a relatively small amount of foreign fluid that decreases the load of the motor 20 is sucked into the electric pump 40, the current detection value Id rises from the time t1, which is the first timing, as a starting point similarly to the normal time, but since the load becomes smaller than that in the normal time, the rising locus of the current detection value Id passes through a region deviated downward from the reference range NR. A reference sign I2c denotes a second current detection value obtained at time t2 (second timing) when a relatively small amount of foreign fluid that decreases the load of the motor 20 is sucked into the electric pump 40.

For example, when a relatively large amount of foreign fluid (particularly, the air or the like) that decreases the load of the motor 20 is sucked into the electric pump 40, the load becomes very small compared with the normal time due to a shortage of supply of the cooling oil F to the electric pump 40. Therefore, in inverse proportion to the increase of the actual rotation speed Rm, the current detection value Id is lowered starting from the time t1 that is the first timing. The descending locus of the current detection value Id in this case passes through a region deviated downward from the reference range NR. A reference sign I2d denotes a second current detection value obtained at time t2 (second timing) when a relatively large amount of foreign fluid that decreases the load of the motor 20 is sucked into the electric pump 40.

As illustrated in FIG. 3, a parameter representing a change in the current detection value Id is calculated based on the first current detection value I1 obtained at the first timing and the second current detection value I2 obtained at the second timing, and it is determined whether or not the calculated parameter deviates from the predetermined reference range NR, whereby it is possible to determine whether or not a foreign fluid suction abnormality has occurred in the electric pump 40. In the present embodiment, the control unit 13 calculates a change amount ΔId per unit time of the current detection value Id as a parameter representing a change in the current detection value Id, and determines whether or not the change amount ΔId deviates from the reference range NR, thereby determining whether or not a foreign fluid suction abnormality has occurred in the electric pump 40. Hereinafter, the description will be continued while returning to FIG. 2.

The control unit 13 calculates the change amount ΔId per unit time of the current detection value Id after the first timing based on the first current detection value I1 acquired in step S2 and the second current detection value I2 acquired in step S3, and determines whether or not the calculated change amount ΔId deviates from the reference range NR (step S4). The change amount ΔId per unit time of the current detection value Id after time t1 which is the first timing is expressed by Expression (1) provided below. In the following description, the change amount ΔId expressed by Expression (1) may be referred to as a current change amount. In the Expression (1), time t2 represents the second timing at which the actual rotation speed Rm of the motor 20 becomes greater than or equal to the predetermined value Rm1.

$$\Delta Id = (I2 - I1)/(t2 - t1) \tag{1}$$

The reference range NR is defined by a minimum value and a maximum value that can be taken by the current change amount ΔId when the electric pump 40 is normal. The minimum value and the maximum value of the current change amount ΔId when the electric pump 40 is normal are determined in advance by experiment, simulation, or the like, and stored in advance in the storage unit 14. That is, in step S4, the control unit 13 reads a minimum value and a maximum value of the current change amount ΔId from the storage unit 14, and determines that the current change amount ΔId is out of the reference range NR when the calculated current change amount ΔId is not included in a range from the minimum value to the maximum value.

When "No" in step S4, that is, when the current change amount ΔId does not deviate from the reference range NR, it is estimated that the electric pump 40 is normal. In this case, the control unit 13 ends the first pump abnormality diagnosis process.

On the other hand, when "Yes" in step S4, that is, when the current change amount ΔId deviates from the reference range NR, it is estimated that a foreign fluid suction abnormality has occurred in the electric pump 40. In this case, the control unit 13 determines that a foreign fluid suction abnormality has occurred in the electric pump 40, transmits a foreign fluid suction error notification for notifying that a foreign fluid suction abnormality has occurred in the electric pump 40, and transmits an electric pump stop notification for notifying that the electric pump 40 is to be stopped, to the host control device (step S5).

Then, after transmitting the foreign fluid suction error notification and the electric pump stop notification to the host control device, the control unit 13 controls the motor drive circuit 11 to stop the motor 20 of the electric pump 40 (step S6).

As described above, when the motor 20 is in the steady rotation state, the control unit 13 executes the first pump abnormality diagnosis process, whereby occurrence of the foreign fluid suction abnormality in the electric pump 40 can be detected. In addition, when the foreign fluid suction abnormality occurs in the electric pump 40, it is possible to prevent heat generation, wear, seizure, and the like in the electric pump 40 in advance by stopping the motor 20 of the electric pump 40.

Figure 4:
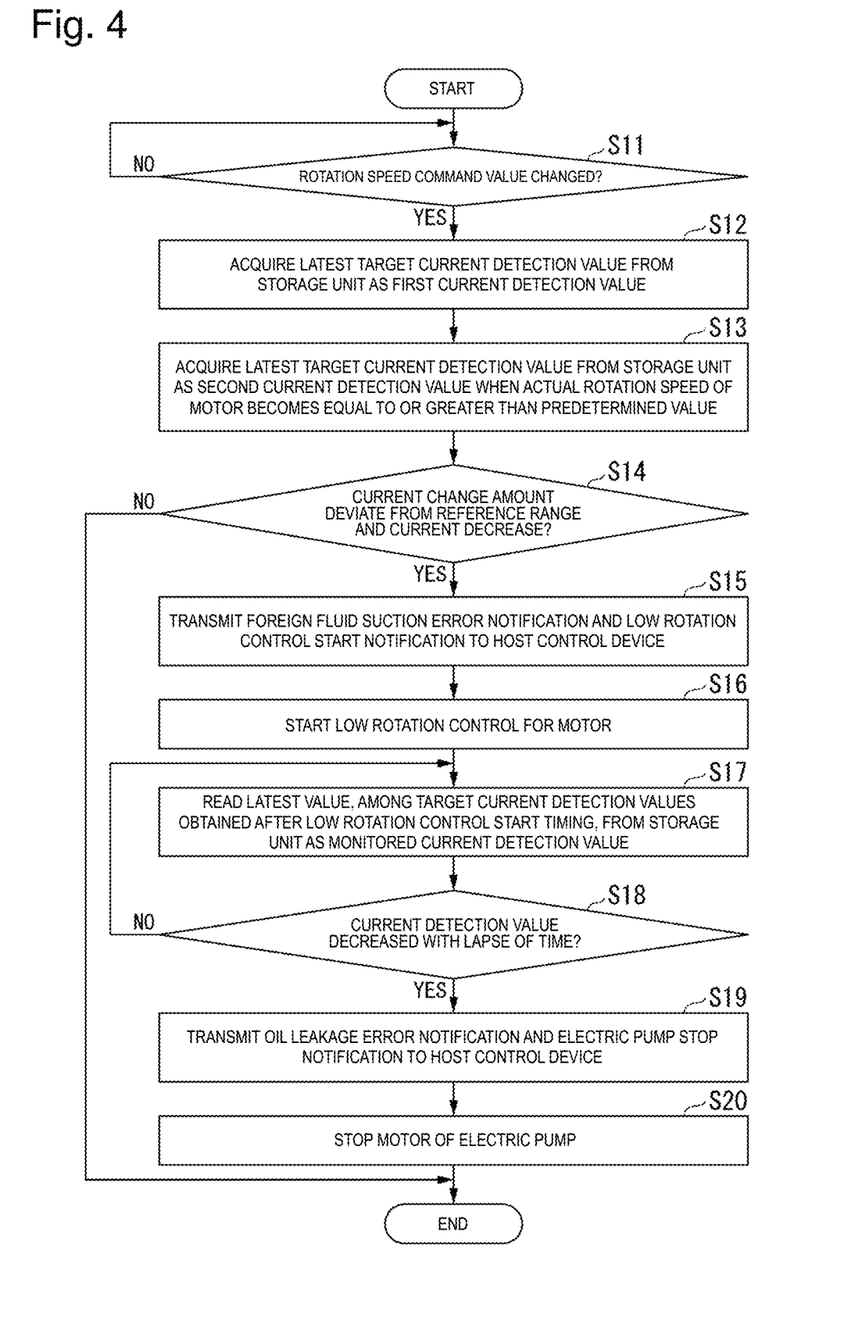
FIG. 4 is a flowchart illustrating a second pump abnormality diagnosis process executed by a control unit when a motor is in a steady rotation state.

Next, a second pump abnormality diagnosis process that is a second example of the pump abnormality diagnosis process will be described with reference to FIGS. 4 and 5. FIG. 4 is a flowchart illustrating the second pump abnormality diagnosis process executed by the control unit 13. The control unit 13 executes the second pump abnormality diagnosis process when the motor 20 is in the steady rotation state.

Figure 5:
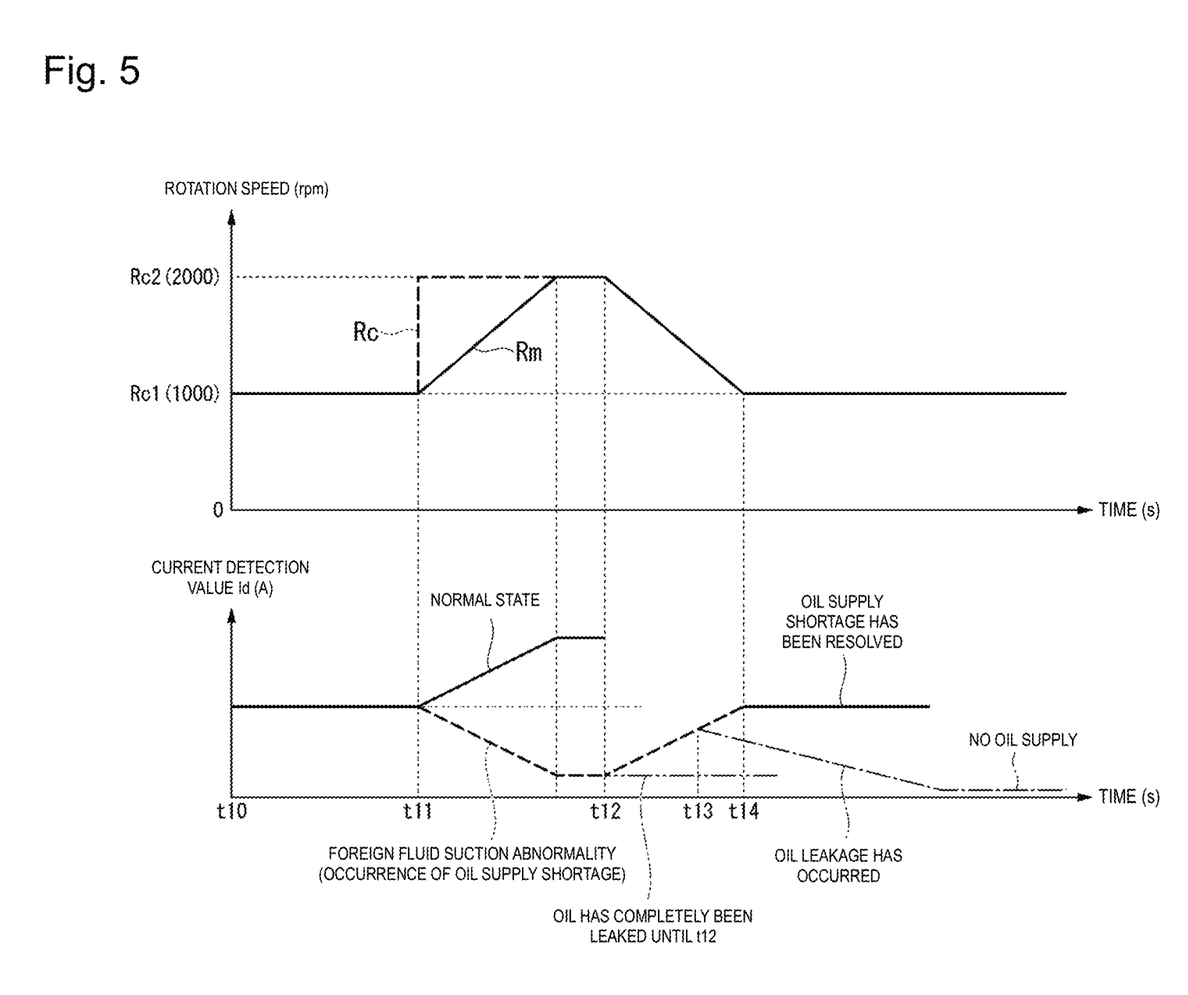
FIG. 5 is a diagram illustrating a second example of temporal changes of a rotation speed command value, an actual rotation speed, and a current detection value.

For example, in FIG. 5, a period from time t10 to time t11 is a steady rotation period in which the motor 20 is in the steady rotation state. During the steady rotation period, the actual rotation speed Rm of the motor 20 coincides with the first command value Rc1. In the example illustrated in FIG. 5, the first command value Rc1 is 1000 rpm, and the actual rotation speed Rm of the motor 20 in the steady rotation period is also 1000 rpm. As illustrated in FIG. 5, in the steady rotation period, the current detection value Id supplied from the shunt resistor 12 to the control unit 13 is constant. The control unit 13 executes moving average calculation of the current detection value Id in parallel with the second pump abnormality diagnosis process.

As illustrated in FIG. 4, when the second pump abnormality diagnosis process is started when the motor 20 is in the steady rotation state, the control unit 13 first determines whether or not the rotation speed command value Rc has changed from the first command value Rc1 to the second command value Rc2 (step S11). The second command value Rc2 is larger than the first command value Rc1 by a predetermined value or more. That is, in step S11, the control unit 13 determines whether or not the rotation speed command value Rc has increased from the first command value Rc1 to the second command value Rc2.

When "No" in step S11, that is, when the rotation speed command value Rc does not change from the first command value Rc1 to the second command value Rc2, the control unit 13 repeatedly executes the process of step S11 at predetermined time intervals until the rotation speed command value Rc changes from the first command value Rc1 to the second command value Rc2.

On the other hand, when "Yes" in step S11, that is, when the rotation speed command value Rc has changed from the first command value Rc1 to the second command value Rc2, the control unit 13 acquires the latest target current detection value from the storage unit 14 as the first current detection value I1 at the first timing when the rotation speed command value Rc has changed (step S12).

In the example illustrated in FIG. 5, it is assumed that the rotation speed command value Rc changes (rises) from the first command value Rc1 to the second command value Rc2 at time t11. As an example, the second command value Rc2 is 2000 rpm. In this case, the control unit 13 acquires the latest target current detection value as the first current detection value I1 from the storage unit 14 at time t11 (first timing).

Subsequently, the control unit 13 acquires the latest target current detection value from the storage unit 14 as the second current detection value I2 at the second timing when the actual rotation speed Rm of the motor 20 becomes equal to or greater than a predetermined value after the first timing (step S13).

Then, the control unit 13 calculates the change amount ΔId per unit time of the current detection value Id after the first timing based on the first current detection value I1 acquired in step S12 and the second current detection value I2 acquired in step S13, and determines whether or not the calculated current change amount ΔId deviates from the reference range NR and also the second current detection value I2 decreases with respect to the first current detection value I1 (step S14).

When "No" in step S14, that is, when the current change amount ΔId does not deviate from the reference range NR and the second current detection value I2 does not decrease with respect to the first current detection value I1, it is estimated that the electric pump 40 is normal. In this case, the control unit 13 ends the second pump abnormality diagnosis process. When the current change amount ΔId deviates from the reference range NR and the second current detection value I2 does not decrease with respect to the first current detection value I1, the control unit 13 executes the same processing as steps S5 and S6 of the first pump abnormality diagnosis process and then ends the second pump abnormality diagnosis process.

On the other hand, when "Yes" in step S14, that is, when the current change amount ΔId deviates from the reference range NR and the second current detection value I2 decreases with respect to the first current detection value I1, it is estimated that a relatively large amount of foreign fluid (particularly, the air or the like) that decreases the load of the motor 20 is sucked into the electric pump 40. In this case, the control unit 13 determines that a foreign fluid suction abnormality has occurred in the electric pump 40, transmits a foreign fluid suction error notification for notifying that a foreign fluid suction abnormality has occurred in the electric pump 40, and transmits a low rotation control start notification for notifying that low rotation control of the motor 20 is started, to the host control device (step S15).

After transmitting the foreign fluid suction error notification and the low rotation control start notification to the host control device, the control unit 13 controls the motor drive circuit 11 to start low rotation control to rotate the motor 20 at the rotation speed corresponding to the first command value Rc1 (step S16). In the example illustrated in FIG. 5, it is assumed that the control unit 13 starts the low rotation control from time t12. Hereinafter, the timing at which the control unit 13 starts the low rotation control may be referred to as low rotation control start timing. As described above, when not only it is determined that a foreign fluid suction abnormality has occurred in the electric pump 40 but also the second current detection value I2 decreases with respect to the first current detection value I1, the control unit 13 controls the motor drive circuit 11 to rotate the motor 20 at the rotation speed corresponding to the first command value Rc1.

As illustrated in FIG. 5, when the control unit 13 starts the low rotation control from time t12, the actual rotation speed Rm of the motor 20 starts to decrease toward the first command value Rc1 from time t12 as the starting point. When the cause of the abnormality of the electric pump 40 is only suction of a foreign fluid, supply of the cooling oil F to the pump 30 is improved by decreasing the rotation speed of the motor 20, and the shortage of supply of the cooling oil F to the pump 30 starts to be resolved. As a result, since the load of the motor 20 increases from time t12 as the starting point, the current detection value Id also increases from time t12 as the starting point that is the low rotation control start timing. When the shortage of supply of the cooling oil F to the pump 30 is completely resolved at time t14 when the actual rotation speed Rm of the motor 20 coincides with the first command value Rc1, the current detection value Id returns to the value before time t11 that is the command change timing.

On the other hand, as illustrated in FIG. 5, in the case where oil leakage is included in the cause of the abnormality of the electric pump 40, similarly to the above, the current detection value Id rises from the time t12 as the starting point that is the low rotation control start timing, but does not return to the value before time t11 that is the command change timing. The current detection value Id decreases with a lapse of time from time t13 that is before time t14 at which the actual rotation speed Rm of the motor 20 coincides with the first command value Rc1. Therefore, by determining whether or not the current detection value Id has decreased with a lapse of time without returning to the value before the command change timing based on the change in the current detection value Id after the low rotation control start timing, it is possible to determine whether or not oil leakage has occurred in the delivery path of the cooling oil F including the electric pump 40.

The control unit 13 reads the latest value, among the target current detection values obtained after the low rotation control start timing, from the storage unit 14 as a monitored current detection value (step S17). When the target current detection value to be read as a monitored current detection value is not stored in the storage unit 14 at the time of execution of step S17, the control unit 13 may suspend execution of the processing of step S17 until the target current detection value to be read as a monitored current detection value is stored in the storage unit 14.

Subsequently, based on the change in the monitored current detection value, the control unit 13 determines whether or not the current detection value Id has decreased with a lapse of time without returning to the value before the command change timing (step S18). When "No" in step S18, the control unit 13 returns to the processing of step S17. After returning to step S17 and updating the monitored current detection value to the latest value, the control unit 13 again proceeds to step S18 and determines whether or not the current detection value Id has decreased with a lapse of time without returning to the value before the command change timing, based on a change in the monitored current detection value. As a result, the change in the current detection value Id after the low rotation control start timing is monitored by the control unit 13.

On the other hand, when "Yes" in step S18, that is, when the current detection value Id has decreased with a lapse of time without returning to the value before the command change timing, it is estimated that oil leakage has occurred in the delivery path of the cooling oil F including the electric pump 40. In this case, the control unit 13 determines that oil leakage has occurred, transmits an oil leakage error notification for notifying that oil leakage has occurred, and transmits an electric pump stop notification for notifying that the electric pump 40 is to be stopped, to the host control device (step S19).

Then, after transmitting the oil leakage error notification and the electric pump stop notification to the host control device, the control unit 13 controls the motor drive circuit 11 to stop the motor 20 of the electric pump 40 (step S20).

As described above, when the motor 20 is in the steady rotation state, the control unit 13 executes the second pump abnormality diagnosis process, whereby occurrence of a foreign fluid suction abnormality in the electric pump 40 can be detected. In the second pump abnormality diagnosis process, when a foreign fluid suction abnormality occurs in the electric pump 40 and the second current detection value I2 decreases with respect to the first current detection value I1, the motor 20 is not stopped, and the motor 20 is controlled to rotate at a low speed corresponding to the first command value Rc1. As a result, when the cause of the abnormality of the electric pump 40 is only the suction of the foreign fluid such as the air in particular, supply of the cooling oil F to the pump 30 is improved, and the shortage of supply of the cooling oil F to the pump 30 is resolved. As a result, the electric pump 40 can be continuously operated without being stopped. However, after the low rotation control start timing, in the case where the current detection value Id decreases with a lapse of time without returning to the value before the command change timing, that is, in the case where it is estimated that oil leakage has occurred in the delivery path of the cooling oil F including the electric pump 40, heat generation, wear, seizure, and the like in the electric pump 40 can be prevented in advance by stopping the motor 20.

As described above, in the present embodiment, the control unit 13 determines whether or not a foreign fluid suction abnormality occurs in the electric pump 40, based on the first current detection value I1 acquired at the first timing when the rotation speed command value Rc changes from the first command value Rc1 to the second command value Rc2 and the second current detection value I2 acquired after the first timing.

According to the present embodiment as described above, it is possible to detect occurrence of a foreign fluid suction abnormality in the electric pump 40 based on the change in the current detection value generated when the rotation speed changes.

In the present embodiment, the control unit 13 calculates a parameter representing a change in the current detection value Id based on the first current detection value I1 and the second current detection value I2, and determines that a foreign fluid suction abnormality has occurred in the electric pump 40 when the calculated parameter deviates from the predetermined reference range NR.

When the electric pump 40 is normal, the current detection value Id should rise through the predetermined reference range NR starting from the first timing at which the rotation speed command value Rc changes from the first command value Rc1 to the second command value Rc2. However, when a foreign fluid is sucked into the electric pump 40, the locus of the current detection value Id starting from the first timing passes through a region outside the reference range NR. Therefore, if the parameter representing the change in the current detection value Id deviates from the predetermined reference range NR, it can be determined that a foreign fluid suction abnormality has occurred in the electric pump 40.

In the present embodiment, when it is determined that a foreign fluid suction abnormality has occurred in the electric pump 40, the control unit 13 controls the motor drive circuit 11 to stop the motor 20.

In this way, when a foreign fluid suction abnormality occurs in the electric pump 40, it is possible to prevent heat generation, wear, seizure, and the like in the electric pump 40 in advance by stopping the motor 20 of the electric pump 40.

In the present embodiment, when not only it is determined that a foreign fluid suction abnormality has occurred in the electric pump 40 but also the second current detection value I2 decreases with respect to the first current detection value I1, the control unit 13 controls the motor drive circuit 11 to rotate the motor 20 at a rotation speed corresponding to the first command value Rc1.

As a result, when the cause of the abnormality in the electric pump 40 is only suction of a foreign fluid such as the air in particular, supply of the cooling oil F to the pump 30 is improved, and the shortage of supply of the cooling oil F to the pump 30 is resolved. As a result, the electric pump 40 can be continuously operated without being stopped.

In the present embodiment, the control unit 13 stops the motor 20 when the current detection value decreases with a lapse of time in a state where the motor 20 is rotated at a rotation speed corresponding to the first command value Rc1.

As described above, after the low rotation control start timing, in the case where the current detection value decreases with a lapse of time without returning to the value before the command change timing, that is, in the case where it is estimated that oil leakage has occurred, heat generation, wear, seizure, and the like in the electric pump 40 can be prevented in advance by stopping the motor 20.

In the present embodiment, the control unit 13 calculates the parameter based on the first current detection value I1 and the second current detection value I2 that is acquired at the second timing when the actual rotation speed Rm of the motor 20 becomes equal to or greater than a predetermined value after the first timing.

As a result, since the second current detection value I2 is acquired at the second timing when it becomes clear that the actual rotation speed Rm of the motor 20 correctly follows the change in the rotation speed command value Rc, the parameter representing the change in the current detection value Id can be calculated more accurately.

In the present embodiment, the control unit 13 calculates the change amount ΔId per unit time of the current detection value Id as the above-described parameter, based on the first current detection value I1 and the second current detection value I2.

As a result, when the change amount ΔId per unit time of the current detection value Id deviates from the reference range NR, it can be determined that a foreign fluid suction abnormality has occurred in the electric pump 40.

The present invention is not limited to the above embodiments, and the configurations described in the present description can be appropriately combined within a range not conflicting with one another.

In the above embodiment, a mode in which the change amount ΔId per unit time of the current detection value Id is calculated as a parameter, based on the first current detection value I1 and the second current detection value I2, has been exemplified. However, the present invention is not limited to this. For example, a deviation (=I2−I1) between the first current detection value I1 and the second current detection value I2 may be calculated as a parameter representing a change in the current detection value Id.

In the above embodiment, a mode in which the motor is controlled based on the rotational position information obtained from the rotation angle sensor has been exemplified. However, for example, a sensorless control system in which the motor is controlled based on rotational position information obtained from a counter electromotive voltage of the motor or the like may be adopted.

In the above embodiment, as an electric pump device of the present invention, the electric pump device 100 that supplies the cooling oil F to a driving motor mounted on a hybrid vehicle has been exemplified. However, the electric pump device of the present invention is not limited thereto, and the present invention can also be applied to, for example, an electric pump device that supplies oil to a transmission. The fluid discharged from the electric pump is not limited to oil such as cooling oil.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls a motor of an electric pump, the motor control device comprising:
   a drive unit that supplies a drive current to the motor;
   a control unit that controls a rotation speed of the motor by controlling the drive unit based on a rotation speed command value; and
   a current detection unit that detects the drive current supplied to the motor, and supplies a current detection value indicating a detection result of the drive current to the control unit,
   wherein the control unit determines whether or not a foreign fluid suction abnormality occurs in the electric pump, based on a first current detection value acquired at a first timing when the rotation speed command value changes from a first command value to a second command value and a second current detection value acquired after the first timing;
   wherein the control unit calculates a parameter indicating a change in the current detection value based on the first current detection value and the second current detection value, and determines that the foreign fluid suction abnormality has occurred in the electric pump when the calculated parameter deviates from a predetermined reference range.

2. The motor control device according to claim 1, wherein when it is determined that the foreign fluid suction abnormality has occurred in the electric pump, the control unit controls the drive unit to stop the motor.

3. The motor control device according to claim 1, wherein when not only it is determined that the foreign fluid suction abnormality has occurred in the electric pump but also the second current detection value decreases with respect to the first current detection value, the control unit controls the drive unit to rotate the motor at a rotation speed corresponding to the first command value.

4. The motor control device according to claim 3, wherein the control unit stops the motor when the current detection value decreases with a lapse of time in a state where the motor is rotated at the rotation speed corresponding to the first command value.

5. The motor control device according to claim 1, wherein the control unit calculates the parameter based on the first current detection value and the second current detection value that is acquired at a second timing when an actual rotation speed of the motor becomes equal to or greater than a predetermined value after the first timing.

6. The motor control device according to claim 1, wherein the control unit calculates a change amount per unit time of the current detection value as the parameter, based on the first current detection value and the second current detection value.

7. An electric pump device comprising:
   an electric pump; and
   the motor control device according to claim 1, the motor control device controlling the motor of the electric pump.

* * * * *